W. H. Merrick,
Converting Motion.
No. 112,269. Patented Feb. 28, 1871.
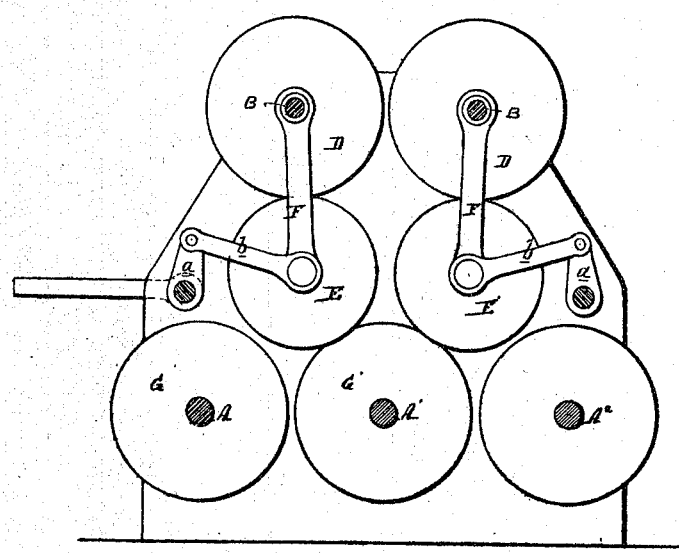
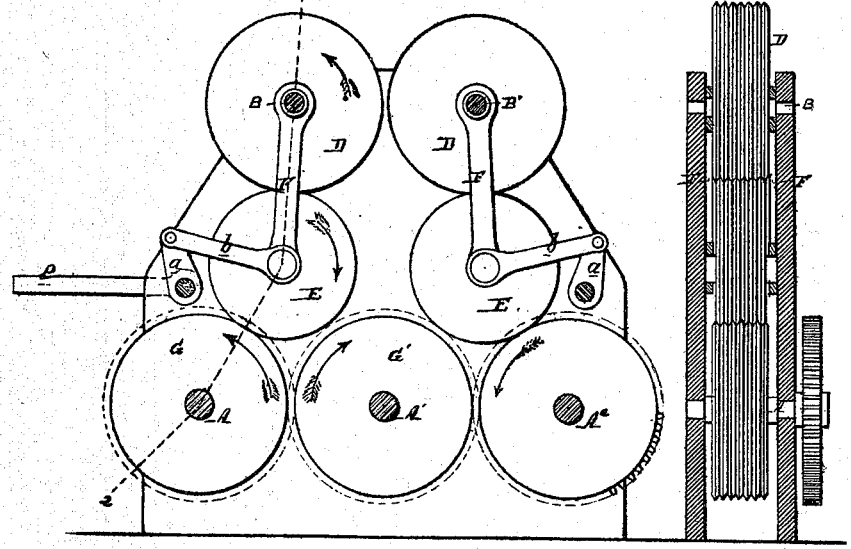 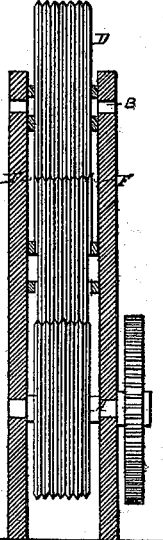
Witnesses: Wm A Steel, Jno. B. Harding.
W. H. Merrick
by his Att'ys
Howson and Son

United States Patent Office.

WILLIAM HENRY MERRICK, OF PHILADELPHIA, PENNSYLVANIA.

Letters Patent No. 112,269, dated February 28, 1871.

IMPROVEMENT IN DEVICES FOR TRANSMITTING AND REVERSING ROTARY MOTION.

The Schedule referred to in these Letters Patent and making part of the same.

---

I, WILLIAM HENRY MERRICK, of Philadelphia, county of Philadelphia, State of Pennsylvania, have invented a Device for Transmitting and Reversing Rotary Motion, of which the following is a specification.

Nature and Object of the Invention.

My invention consists of a device too fully explained hereafter to need preliminary description, whereby a rotary motion in either direction may be imparted to a shaft from either of two continuously-revolving shafts geared together, the device being especially applicable to steam-cranes and other hoisting apparatus, as the mechanism permits the rising and lowering of heavy weights without reversing the driving-engine.

Description of the Accompanying Drawing.

Figures 1 and 2 illustrate my device for transmitting and reversing rotary motion, showing the idler-wheels in different positions; and Figure 3 a transverse section on the line 1 2, fig. 2.

General Description.

A A$^1$ and A$^2$ are three shafts adapted to fixed bearings, and geared together by cog-wheels so as to have a positive revolving motion, say in the direction of the arrows; and B and B' are shafts to which a revolving motion in either direction has to be imparted from the shafts A, A$^1$, and A$^2$.

The positive power is derived from the shafts A, A$^1$, or A$^2$, any one of which may be the crank-shaft of a non-reversible steam-engine, for the direction of the motion of these shafts is never changed, but the shafts B and B', to which the rotary motion is transmitted, can be made to revolve in either direction by the appliances which I will now proceed to describe.

To each shaft B is secured a friction-wheel, D, that is, a wheel with concentric V-shaped grooves and ribs on its periphery, as shown in fig. 3, and this wheel is maintained in gear with an idler and wheel, E, of similar character by links, F, in the lower ends of which the axle of the said idler-wheel revolves, the links being loosely connected to the shaft B.

The idler-wheel thus hung to the shaft B may be adjusted to a position free from contact with a friction-wheel, G, on the shaft A, or free from a friction-wheel, G', on the shaft A$^1$, in which case the said idler-wheel, as well as the wheel D, will be motionless, but when adjusted to the position shown in fig. 1, the idler-wheel will be the means of transferring a rotary motion from the wheel F' to the wheel D in one direction, which, however, will revolve in a contrary direction should the idler be adjusted to the position shown in fig. 2, so as to be the medium of communicating a rotary motion from the wheel G' to the wheel D.

The device for controlling the idler consists, in the present instance, of an arm, $a$, connected by a link, $b$, to the axis of the idler, the said arm being secured to a shaft carrying an operating-lever, $e$.

The above remarks will apply to the idler E' as regards the reversal of the motion of the wheel D'; in fact, the mechanism in the drawing illustrates my invention as carried out in a duplex form, which may be advisable in some cases, as for instance, in a steam-crane where from one prime mover the hoisting-tackle may be raised or lowered by one set of friction-wheels and the crane swung round through the medium of another set of friction-wheels; and, it may be remarked, that I have applied my invention to a steam-crane with the most satisfactory results, the reversing, stopping, and starting of the shafts B or B' being easily accomplished and free from the shocks and jars which accompany the action of a reversing engine or other reversing mechanism.

It will be observed that the distance between the peripheries of the friction-wheels D and G is such in relation to the diameter of the idler-wheel E that, while the latter can be drawn into tight frictional contact with the two wheels without much effort, it cannot be wedged or wedge itself so tightly as to cause undue strains on the shafts A and B, and the same remarks will apply to the same idler as regards the friction-wheels D and G'.

The axle of the idler-wheel E should be slightly loose in the links F, so that, on the idler accommodating itself to the peripheries of the friction-wheels with which it is brought into contact, there can be no undue strain on the axle of the idler, or on the links in which the axle turns.

It is essential in carrying out my invention that the motion of the wheels G and G' should be positive and unchangeable, or, in other words, that they should be driven by cog-gearing and not by frictional contact, while the wheels for transferring the motion of the shafts A or A$^1$ to the shaft B should be friction-wheels of the character illustrated and described.

Claim.

The combination of two friction-wheels to which a positive rotary motion is imparted in contrary directions, and in fixed bearings, with a friction-wheel, D, also arranged to revolve in fixed bearings, and an adjustable idler-wheel, E, the whole being arranged for operating substantially in the manner described.

In testimony whereof I have signed my name to this specification in the presence of two subscribing witnesses.

WILLIAM H. MERRICK.

Witnesses:
 WM. A. STEEL,
 JNO. B. HARDING.